United States Patent [19]
Wesel, Sr.

[11] 3,743,329
[45] July 3, 1973

[54] PIPE COUPLING

[75] Inventor: Peter E. Wesel, Sr., Blacksburg, Va.

[73] Assignee: Corning Glass Works, Corning, N.Y.

[22] Filed: Dec. 17, 1971

[21] Appl. No.: 209,036

[52] U.S. Cl.......... 285/236, 285/423, 285/DIG. 12, 285/DIG. 16
[51] Int. Cl............................................. F16l 21/00
[58] Field of Search.................... 285/236, 233, 423, 285/373, DIG. 12, DIG. 16

[56] References Cited
UNITED STATES PATENTS

| | | | |
|---|---|---|---|
| 3,630,550 | 12/1971 | Zine | 285/373 |
| 3,527,484 | 9/1970 | Wolkden | 285/236 |
| 3,402,946 | 9/1968 | Dedion | 285/373 X |
| 3,233,922 | 2/1966 | Evans | 285/236 |
| 3,633,947 | 1/1972 | Nelson | 285/236 |

*Primary Examiner*—Dave W. Arola
*Attorney*—Clarence R. Patty, Jr. and Ernst H. Ruf

[57] ABSTRACT

A coupling for joining first and second pipe end portions, the coupling including an annular resilient liner surrounding the pipe end portions and having profiled first and second portions as well as a cylindrical third portion, a force development member having a clamping ring and multiple independent constriction means surrounding the liner for constricting the ring in the areas thereof generally overlying the liner first and third portions to adapt to the wide outside diameter variations due to pipe manufacturing tolerances. The coupling further includes raised sealing ridges on the liner first and second portions as well as interposed barrier means between the pipe end portions and the liner first and second section, with an adhesive means being interposed between the liner third portion and an annular section of the first pipe end portion.

3 Claims, 3 Drawing Figures

PATENTED JUL 3 1973   3,743,329

INVENTOR.
Peter E. Wesel, Sr.
BY
ATTORNEY

PIPE COUPLING

BACKGROUND OF THE INVENTION

The field to which this invention pertains is that of pipe couplings in fluid handling systems and more particularly, couplings having utility in joining an unbeaded cylindrical glass pipe end portion to a beaded glass pipe end portion.

The patent art is replete with pipe couplings that are used for joining a plain ended glass pipe to a beaded glass pipe. Some of these patents, such as U.S. Pat. No. 3,419,291 to Tomb et al., teach the utilization of a bead-like adaptor member that is held around the end of an unbeaded cylindrical section of a glass pipe by means of a metal band bonded to the outer surface of the pipe and interlocked with the adaptor member. Thus, in effect an artificial bead is produced and a second metal band is then used to maintain a flexible gasket around the adaptor member and the conventional beaded pipe to achieve an essentially normal bead-to-bead coupling. While this coupling is quite successfully used, it is however somewhat time consuming to assemble due to the number of parts involved and the bonding process utilized.

The coupling shown in U.S. Pat. No. 3,376,055 to Donroe, which is also used for joining a plain ended glass pipe to a beaded glass pipe, utilizes a thin Teflon sleeve intimately surrounded by a sleeve of rubber, with the rubber sleeve being in turn surrounded by a split sheet metal clamping collar that is tightenable by means of a single, conventional nut and bolt assembly. While this design is workable it should be noted that on the plain ended glass pipe the coupling has to perform both the gripping and sealing functions. The clamping collar must be drawn up very tight otherwise there is a tendency for the plain ended pipe to "walkout" of the coupling. The use of only one constriction means sometimes produces unbalanced forces on the pipe ends especially when the dimensions of the two pipe end portions are near the opposite ends of their dimensional tolerance limits. If, for example, the beaded end is near its maximum size and the plain end is near its minimum size, unbalanced forces are exerted on the beaded end since the coupling must be tightened to the extent to provide both sealing and gripping of the plain ended pipe.

Another problem in the prior art, as shown by both Donroe and in U.S. Pat. No. 3,232,647 to Kirchoff is that the sharp edge of the plain ended glass pipe directly abuts the Teflon sleeve. If vibrations take place in the coupling during use, the sharp outer edge may abrade or cut into the Teflon sleeve and thus permit leakage of corrosive fluid to the rubber sleeve which has less chemical resistance. In addition, especially in the structure of the Donroe patent, cutting of the Teflon sleeve can occur during the insertion of the plain ended glass pipe into the coupling.

The coupling shown in FIG. 2 of U.S. Pat. No. 3,527,484 to Walkden, presents an improvement over Donroe in that a coating of non-adhesive friction material is interposed between the plain ended pipe and the elastomeric sleeve so as to reduce the "walkout" tendency. However, the use of but a single constriction means can produce unbalanced forces and consequent breakage. In addition, there is no protection of the Teflon gasket against the sharp edge of the plain-ended glass pipe and there are no multiple sealing provisions on the beaded side of the coupling.

This invention is also an improvement over the pipe coupling shown in co-pending U.S. Pat. application Ser. No. 13,006 to Zine, filed Feb. 20, 1970, now U.S. Pat. No. 3,630,550 and also assigned to the assignee of this invention. While the Zine coupling is quite successfully used, it does require the use of first and second axially adjacent and attached force-development members in conjunction with liner first and second sections respectively, for gripping and sealing a cylindrical pipe end portion to the beaded end portion of a second pipe. The use of two force-development members not only is more expensive, but also makes for an axially longer coupling, namely about 1½ times longer than the present coupling. In addition, Zine uses but one raised sealing ridge for sealing the cylindrical pipe end portion, with this ring being protected from the sharp outer edge of the cylindrical pipe end by an inwardly projecting expander ring whose function it is to guide the sharp pipe edge over the sealing ridge without cutting the barrier means. In practice however, since the expander ring (which is an integral part of the liner) is of the same material as the liner, it is frequently cut away by the very edge of the pipe it is supposed to protect the sealing ridge from, with consequent damage to the sealing ridge. While Zine does use a skive protector ring, it has the single function of cradling the sharp pipe edge whereas the compliant skive protector and expander ring of the present invention, by reason of its press fit within the liner also slightly radially expands the liner to permit insertion of the pipe end without damage to the liner barrier multiple sealing ridges.

SUMMARY OF THE INVENTION

This invention solves the previously-mentioned problems by utilizing a whole new concept in the design and structure of pipe couplings used for joining plain and beaded glass pipe ends. It allows a relatively soft seal approach (lower stress) but provides excellent corrosion resistance, by utilizing multiple seals at each pipe end while at the same time providing positive gripping of the plain ended glass pipe. These seemingly diverse objectives ae met by the use of a single, flexible, split sheet metal clamping collar or force development member, having multiple independent constriction means in conjunction with a generally cylindrical low-/intermediate hardness, elastomer liner having two semi-independent portions joined by an intermediate inwardly-extending rib portion. The use of multiple independent constriction means in combination with a flexible clamp ring and semi-independent liner portions allows the clamp ring to develop a generally conical configuration if necessary, to adapt to the wide outside diameter variations common in normal pipe manufacturing tolerances. Thus, regardless of the dimensional tolerance variations between the two pipe ends, a lower-than-normal-stress seal can be made on both pipe ends. In addition, multiple raised pressure sealing ridges are used on each pipe end and an adhesive means provides positive gripping of the plain cylindrical pipe end.

In summary, this invention related to a pipe coupling for connecting a first pipe portion, having a constant outer diameter and a flat end surface, to an end portion of a second pipe. The coupling includes an annular resilient liner which surrounds the pipe end portions and has an inwardly projecting rib portion extending between the pipe ends as well as profiled first and second portions adjoining the opposite sides of the rib portion and a cylindrical third portion adjoining the profiled second portion; an annular barrier means interposed between the pipe end portions and the liner rib first and second portions; an adhesive means between the liner cylindrical third portion and an annular section of the first pipe end portion; and a force-development member having a flexible clamp ring and bridging strip as well as multiple independent constriction means for constricting the clamp ring in the areas thereof generally overlying the liner first and third portions, with the multiple constriction means allowing the clamp ring to develop a more-or-less conical configuration to thereby adapt to outside diameter variations. The coupling further includes multiple raised sealing ridges on both the liner first and second portions as well as an interference-fitted, compliant skive protector and expander ring to protect the barrier means on the liner rib portion from the sharp outer edge of the first pipe end. In order to further protect the barrier and sealing ridges on the liner second portion from being cut during the assembly of the coupling the interference fit of the skive protector and expander ring cause a slight radial expansion of liner second portion in the direction of a liner recess (located outwardly of the liner rib portion) to remove the raised sealing ridges from the path of the sharp pipe edge.

DESCRIPTION OF THE PREFERRED EMBODIMENTS

Figure 1:
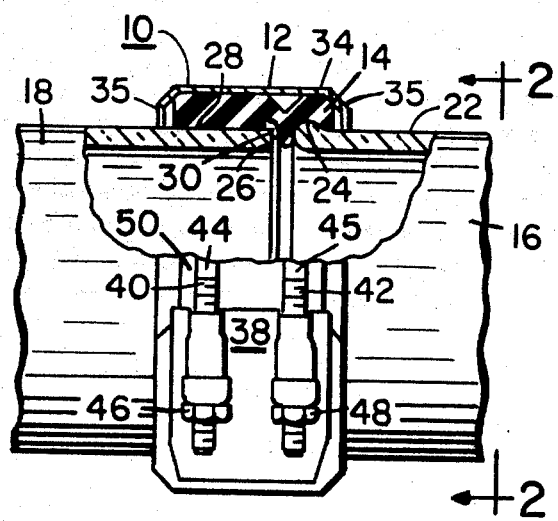
FIG. 1 is a side elevational view, partly in section, of two end portions of glass pipe joined by the coupling of this invention.
Figure 2:
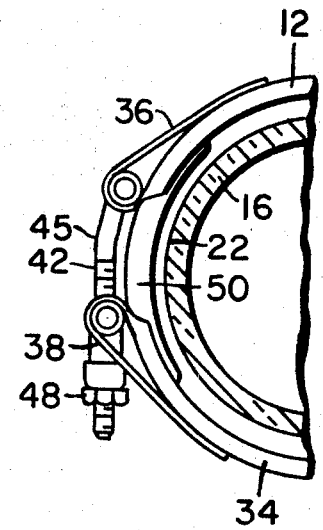
FIG. 2 is a fragmentary, partial, side elevational view of the coupling of FIG. 1 looking in the direction of arrows 2 on FIG. 1.
Figure 3:
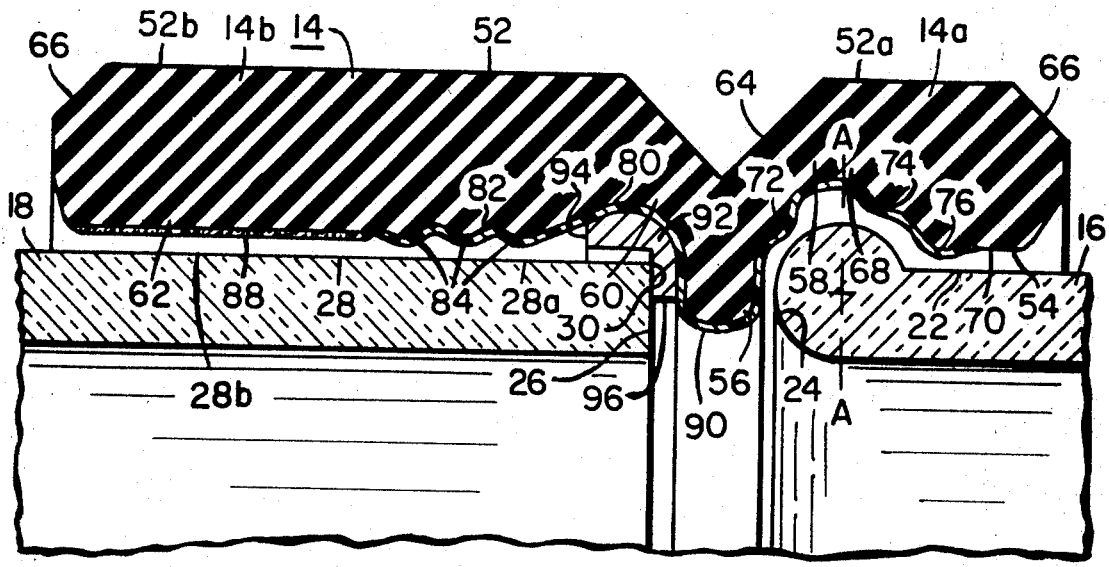
FIG. 3 is an enlarged sectional view of the preferred liner, barrier means and skive protector ring (in their uncompressed state) used in the coupling of this invention.

Referring now to the drawings in detail, FIGS. 1, 2 and 3 show the coupling 10 of this invention which is basically comprised of force-development member 12, force-transmitting member or liner 14 and barrier means 90.

As best seen in FIG. 1, coupling 10 is used in joining pipe end portions 16 and 18. Pipe end portion 16 has a cylindrical outer surface 22 which merges into a bead 24 at its end while pipe end portion 18 has a plain cylindrical end having flat annular end surface 26, cylindrical outer surface 28 and their intersecting edge 30. Cylindrical outer surface 28 has first and second portions 28a and 28b which will be explained in more detail later.

Force-development member or clamp ring 12, which is preferably constructed of stainless steel, is basically comprised of generally cylindrical band portion 34 having inwardly sloping frusto-conical surfaces 35 on both sides thereof. The opposite ends of band portion 34 are bent back upon themselves to form terminal portions or loops 36 and 38 respectively, with terminal portion 36 acting as an anchoring point for spaced parallel bolts 40 and 42. Bolts 40 and 42 pass through terminal portion 38 and together with nuts 46, 48 respectively provide two semi independent parallel, substantially similar constriction means 44, 45 for force-development member 12. The throat or open area of band portion 34 between terminal portions 36 and 38 is closed by a tongue or bridging strip 50 (similar in cross-section to band portion 34), preferably having one end permanently attached to one end of band portion 34 and the other end slidably received on the inner surface of the other end of band portion 34. Thus, clamp ring 12 provides resilient liner 14 with at least 360° of surroundment at all times, e.g., in the range from fully open to fully constricted.

As best seen in FIG. 1, which shows coupling 10 subsequent to the tightening of force-development member 12, annular resilient liner 14 is shown in its compressed state, interposed between member 12 and pipe end portions 16 and 18. FIG. 3 shows liner 14 in its uncompressed state. For ease of understanding, liner 14, which has a generally cylindrical outer surface 52 and a generally profiled inner surface 54, may be thought of as consisting of three basic parts, namely portion 14a (surrounding pipe end portion 16), rib portion 56 (extending between pipe end portions 16, 18) and portion 14b (surrounding pipe end portion 18). Inner surface 54 includes inwardly projecting rib portion 56, a first profiled or recessed portion 58 (adjoining one side of rib portion 56), a second profile or recessed section 60 (adjoining the other side of rib portion 56) and a cylindrical third portion 62 (adjoining the outer end of second profiled section 60).

Liner outer surface 52 has a large, preferably V-shaped, recess 64 in the area generally radially outwardly from rib portion 56, with recess 64 substantially reducing the thickness and thereby incresing the flexibility of liner 14 in those sections of liner profiled first and second portions 58 and 60 adjoining liner rib portion 56. Liner outer surface 52, which is divided into portions 52a and 52b by recess 64, further has beveled ends 66 on both sides thereof. Ends 66 are acted against, upon the assembly of coupling 10, by frusto-conical surfaces 35 of clamp ring 12 and substantially prevent extrusion or expansion of liner 14 in an axial direction.

Profiled first portion 58 of liner inner surface 54 has a recessed section 68 surrounding a substantial part of pipe bead portion 24 and a generally cylindrical section 70 surrounding an annular portion of pipe end cylindrical outer surface 22. Liner recessed section 68, which is adapted to receive beaded end 24 of pipe portion 16, has first and second raised sealing or pressure intensifying ridges 72, 74 with the location of ridge 72, preferably being in the range from 30° to 45° on the rib-portion-side of a plane A—A radially passing through the center of pipe beam portion 24 in a direction normal to the longitudinal center axis of pipe end 16. Ridge 74 preferably lies in the range from 45° to 60° on the other side of plane A—A. In addition, a third pressure intensifying ridge 76 is located on cylindrical section 70 of liner first profiled portion 58 in the vicinity of the intersection of recessed section 68 and cylindrical section 70.

Profiled second portion 60 of liner inner surface 54 has recessed section 80 and a contoured section 82, with section 82 having a plurality of inwardly projecting annular, parallel raised sealing or pressure-intensifying ridges 84.

Adjoining the outer end of contoured section 82 of profiled second portion 60 is cylindrical third portion 62 of liner inner surface 54. Portion 62 is provided with an adhesive means 88, preferably of a non-tacky, water tolerant variety that is capable of producing a pressure-activated bond between at least an annular part of portion 62 and an annular part of cylindrical outer surface 28 of pipe end portion 18. An example of a suitable adhesive means 88 is a two layer coating made up of a primer coat of a neoprene-base adhesive and a top coat of a nitrile-base adhesive. Such a combination coating is thoroughly described in co-pending U.S. Pat. application Ser. No. 13,006 filed Feb. 20, 1970 and also assigned to the assignee of this invention. Obviously, other types of adhesive may also be utilized.

As best seen with reference to FIG. 3, liner second profiled portion 60 overlies first or inner peripheral portion 28a of cylindrical outer surface 28 of pipe end portion 18, while liner cylindrical portion 62 (with its adhesive means 88) overlies second outer peripheral portion 28b of surface 28.

Another resilient liner 14 is comprised preferably of a chemically resistant elastomeric material such as a rubber-base compound like noeprene, an EPDM or similar polymer of low-to-intermediate durometer in the range (30 to 60 Shore A hardness) which allows its diameter to be easily reduced by the inward urging of force-development member 12. These materials will support a given stress with only negligible long-time compression "set," with this feature marking them desirable for use in the subject coupling, which generally receives no further physical adjustment after complete closure of member 12.

In addition to adhesive means 88, which covers liner cylindrical third portion 62, the remaining liner inner surface portions (namely liner first and second profiled portions 58 and 60 as well as rib portion 56) are provided with an annular barrier or gasket means 90. Thus, barrier means 90 covers essentially the entire axial extent of liner inner surface 54 (except for portion 62 as noted) including multiple sealing ridges 84 and sealing ridges 72, 74 and 76.

Annular barrier means 90 is preferably comprised of a compliant layer, preferably less than 0.020 inch thick, of fluorofilm material of fluorinated ethylene-propylene or polytetrafluoroethylene synthetic resin which is sold by the E. I. duPont de Nemours Co. under the trademark "Teflon." Barrier means 90 preferably is integral with liner inner surface 54 so that it reacts and yields to conform to pipe end portions 16 and 18 in the same manner as liner 14.

In order to protect barrier means 90 in the area of inwardly-extending rib portion 56 from the generally sharp edge 30 of pipe end portion 18, a compliant skive protector and expander ring 92 is interference-fitted or press-fitted between rib portion 56, recessed section 80 of liner second profiled portion 60 and pipe end portion 18. Ring 92, preferably of high density polypropylene/polyethylene, is comprised of horizontal and vertical lip portions 94, 96 respectively, which effectively cradle edge 30 therebetween, with lip portion 94 abutting an annular portion of pipe outer peripheral surface 28a and lip portion 96 abutting flat annular end surface 26. In addition to serving as a skive protector against edge 30, ring 92 also serves as an expander ring functioning in the following manner: Ring 92, which is made of a compliant material, has a larger maximum free outside diameter than the maximum diameter of liner inner surface recessed section 80 into which ring 92 is press-fitted. This interference fit causes a slight radial expansion of liner second profiled portion 60, in the direction of liner recess 64. This expansion or stretching of liner portion 60 has the effect of slightly displacing or increasing the diameter of contoured section 82, thereby preventing pipe edge 30 from damaging raised sealing ridges 84 during the insertion of pipe end 18 into coupling 10. Thus, in addition to its first function of cradling pipe edge 30, compliant ring 92 has the second and more important function of expanding the diameter of second profiled portion 60 to accept the insertion of pipe end 18 (and its edge 30) without damage to sealing ridge 84 and then, by reason of its compliancy, allowing liner 14 to be displaced inwardly (by member 12) into circumferential contact with the cylindrical outer surface 28 of pipe end 18 without prejudice.

Assembly of pipe end portions 16 and 18 by means of coupling 10 is affected as follows:

With force-development member 12 in open position (i.e., constriction means 44, 45 not tightened) liner 14, after having skive protector and expander ring 92 interference-fitted therewithin, is inserted therein, thereby completing the assembly of coupling 10. It makes no difference which one of pipe end portions 16 and 18 is first connected to coupling 10, thus (with coupling 10 still in the open position) for example, beaded pipe end portion 16 is carefully inserted into interior liner 14 of coupling 10 until bead portion 24 is seated in liner recessed section 68 and abuts liner inwardly projecting rib portion 56. Thereupon, constriction means 45 is partially tightened so as to restrain pipe portion 16 against further axial movement.

The assembly of plain cylindrical pipe end portion 18 into coupling 10 consists of carefully axially inserting portion 18 into the interior of liner 14. The assembly is started from the open end of liner inner surface third portion 62, with preferred non-tacky adhesive means 88 allowing easy insertion of portion 18. As previously noted, ring 92, by reason of its expansion function (of second profiled surface portion 60 toward recess 64), effectively removes multiple sealing ridges 84 from the path of edge 30 to prevent damage to ridges 84 and barrier means 90.

Axial inward movement of pipe end portion 18 is then continued until its annular end surface 26 abuts bead separator vertical lip portion 96, thereby arresting further axial movement. Again, as noted, edge 30 is cradled between ring lip portions 94 and 96.

Upon full insertion of pipe end portion 18, as described, constriction means 44 is preferably fully tightened so as to fully restrain pipe portion 18 against further axial movement. As constriction means 44 is being fully tightened, adhesive means 88 grips pipe end outer peripheral surface 28b and in time bonds itself tenaciously thereto without the use of either heat or solvents. Preferably, the bond produced by adhesive means 88 should not deteriorate with age, but rather even increase its affinity for rubber and glass as time passes. Adhesive means 88 should allow a certain amount of relative movement between pipe end peripheral surface portion 28b and liner 14 during the installation of pipe end portion 18 and during the tightening of constriction means 44. This degree of relative movement is very necessary for obtaining good peripheral surface contact between pipe surface 28b and adhesive means 88. Thus, it is the function of adhesive means 88 to securely grip and attach itself to pipe end peripheral surface portion 28 to thereby restrain pipe portion 18 from all circumferential as well as axial movement in regard to coupling 10.

The sealing of pipe end peripheral surface portion 28 is accomplished on surface portion 28a by means of parallel multiple raised sealing ridges 84. The use of multiple sealing ridges 84 not only provides multiple opportunities to achieve a seal, but more importantly it reduces the hydrostatic load each ridge or seal line must carry in order to achieve the desired seal. The opportunity to develop a force vector in a direction which will allow fluid breaching of the seal line depends on factors such as, the angles of material contact, materials viscosity and materials surface tension etc., as well as the physical principle of the reduction of differential pressures applied between the two sides of the seal line. By allowing two or more chambers to be formed between multiple, spaced sealing ridges 84, (i.e., one chamber between each pair of ridges 84) the total pressure differential can thus be divided across the individual seal lines into lower incremental steps and enables multiple sealing relationships to be made with pipe outer surface portion 28a.

After the complete tightening of constriction means 44, which completes the assembly of cylindrical pipe end portion 18 into coupling 10, constriction means 45 is fully tightened so as to effectively restrain and seal pipe end portion 16 within coupling 10. The sealing of pipe end portion 16 is accomplished on beaded end 24 and cylindrical surface 22 by means of raised sealing ridges 72, 74 and raised sealing ridge 76 respectively. Depending upon the manufacturing tolerances, pipe end portion 16, due to the resiliency of liner 14, may either partially or fully blend into a contour complementary to that of pipe end portion 16. First or inner and second or intermediate raised sealing ridges 72, 74 act as individual seals on beaded portion 24 while third or outer raised sealing ridge 76 seals on cylindrical surface 22. Ridges 72, 74 are necessary in order to develop sufficient gasket factors, i.e., enabling seals to be made at the barrier-glass bead interface. In the event of an undersized glass bead 24, an additional ridge 76 is provided to assure a seal, but will provide it on pipe cylindrical surface 22. The use of these multiple sealing ridges not only provides multiple opportunities to provide a seal, but similarly to previously-described multiple sealing ridges 84, it reduces the hydrostatic load each seal ridge or line must carry in order to achieve the desired seal.

Once constriction means 44 and 45 are fully tightened, the joining of pipe end portions 16 and 18 by means of coupling 10 is fully completed.

It should be noted that liner outer surface recess or groove 64 essentially surrounds major portions of liner sections 68 and 80 which serve as locating areas for pipe bead 24 and skive protector and expander ring 92 respectively. By reducing the thickness of liner 14 in the areas of sections 68 and 80 (adjoining liner rib portion 56), groove 64 divides liner 14 into two semi-independent portions, namely portion 14a (surrounding pipe end portion 16) and portion 14b (surrounding pipe end portion 18). Groove 64 thus acts as a divisor for the loads applied by member 12 and permits portions 14a and 14b to be urged inwardly more or less independently of each other to independently grasp pipe ends 16 and 18.

It must further be noted that constriction means 44 and 45 are equally spaced from the center of clamp ring cylindrical band portion 34 in order to facilitate not having a potentially confusing left hand/right hand situation. However, and very importantly so, constriction means 44 and 45 are located on both sides of liner rib portion 56 respectively, with constriction means 44 overlying liner portion 14b in the area of liner third portion 62 (coated with adhesive means 88) and constriction means 44 overlying liner portion 14a in the area of liner first portion 58. The use of multiple semi independent constriction means 44, 45 in conjunction with flexible clamp ring 34 and semi-independent liner portions 14a, 14b, allows clamp ring 34 to develop a more-or-less conical configuration (either one end larger and one end smaller or vice versa) to adapt to a wide variety of outside diameters of pipe ends 16 and 18 (on either or both sides of joint 10) as may be necessary due to normal pipe manufacturing tolerances.

The use of a low/intermediate durometer (hardness) elastomer liner 14 allows its diameter to be easily reduced by the inward urging of force-development member 12 in a manner that hydrostatically loads not only multiple pressure intensifying ridges 84 on liner portion 14b but also pressure intensifying ridges 72, 74, 76 on liner portion 14a to achieve a seal between these ridges and the contacted pipe end portions. The use of the stated elastomer also provides the means for achieving the development of a maximum area of contact between pipe peripheral portion 28b and adhesive means 88 resulting in the development of very high resistance to adhesive shear and a minimum area exposure of either edge of adhesive means 88 to attack from chemical reactants from either within or outside of pipe coupling 10.

Therefore in summary, it may be said that one primary function of force development member 12, in conjunction with its closure means 45 and liner portion 14a, is to both seal and grip pipe end portion 16. Furthermore, other primary functions of force-development member 12, in conjunction with closure means 44 and liner portion 14b, are to grip and firmly hold pipe end portion 18 as well as provide sealing forces, via multiple sealing ridges on pipe end portion 24.

While the subject invention has been described mainly with reference to a mechanical coupling for coupling glass pipes to glass pipes or glass pipes to pipes of other materials compatible for transporting fluids, such as for example some metals or plastics, it should be noted that with suitable modifications it can be adapted to almost any type of piping systems in addition to glass drain lines.

While this invention has been described in connection with possible forms or embodiments thereof, it is to be understood that changes or modifications may be resorted to without departing from the spirit of the invention or scope of the claims which follow.

I claim:

1. A coupling for connecting a cylindrical pipe end portion to the beaded end portion of a second pipe in axially aligned, non-contacting relation, said coupling including:

a. an annular resilient liner, composed of a low-to-intermediate durometer hardness synthetic elastomeric material, surrounding said pipe end portions, said liner having a substantially cylindrical outer surface with an inwardly directed annular surface recess, said liner further having a profiled inner surface, said inner surface includng an inwardly projecting rib portion extending between said pipe ends with said rib portion being located in the area substantially radially inwardly from said liner external surface recess; a profiled first portion adjoining one side of said rib portion and substantially surrounding said beaded pipe end portion; a profiled second portion having a recessed section and a contoured section, with said recessed section adjoining the other side of said rib portion and substantially surrounding the annular end surface of said cylindrical pipe end portion and said contoured section substantially surrounding a first outer peripheral surface section of said cylindrical pipe end portion; and a cylindrical third portion, adjoining the contoured section of said profiled second portion and surrounding a second annular outer peripheral surface section of said circular pipe end portion;

b. an annular, generally cylindrical, compliant layer of fluorofilm material interposed between said pipe end portions and the rib, first, and second portions of said liner inner surface for substantially the entire axial extent of said liner portions, said layer, which is in the range from 0.005 to 0.020 inches thick, reacting and yielding to conform to said pipe end portions in substantially the same manner as said liner;

c. a force-development member, including a flexible generally cylindrical one piece clamp ring having a bridging strip for providing at least 360° of surroundment of said liner, said clamp ring also surrounding said resilient liner for the full axial extent of said liner, said clamp ring further including multiple semi-independent constriction means for constricting said clamp ring at least in the areas thereof generally overlying said liner first portion and said liner third portion, said multiple semi-independent constriction means allowing said clamp ring, if necessary, to develop a conical configuration to thereby adapt to a variety of outside diameters of pipe ends on one side of said coupling as necessary due to normal pipe manufacturing tolerances; and d. a compliant expander ring of high density plastic material interference-fitted into said recessed section of said liner profiled second portion and abutting the other side of said liner rib portion, said ring by reason of its interference fit, causing a slight radial expansion of the recessed section of said liner profiled second portion into said external surface recess in said liner outer surface, with said radial expansion also slightly increasing the diameter of the contoured section of said liner profiled second portion and thereby preventing said cylindrical pipe end from damaging said liner second section during the insertion of said cylindrical pipe end, said ring, by reason of its compliancy, upon the constriction of said semi-independent constriction means overlying said liner third portion, allowing at least a part of said liner second portion to be displaced radially inwardly into circumferential contact with said cylindrical pipe end first outer peripheral surface section.

2. The pipe coupling of claim 1 wherein said liner external surface annular recess substantially reduces the thickness of said liner in said area and thereby increases the flexibility of said liner in those sections of said liner profiled first and second portions adjoining said liner rib portion, said recess further acting as a divisor for the loads applied to said liner upon the tightening of said clamp ring multiple constriction means, thereby allowing each of said liner first and third portions to be urged inwardly more or less independently of the other to thus grasp said two pipe ends semi-independently of each other.

3. The pipe coupling of claim 2 wherein the contoured section of said liner profiled second portion has a plurality of inwardly projecting, annular, raised sealing ridges, said sealing ridges being raised with reference to said liner third portion, said sealing ridges, together with said barrier means, enabling multiple axially spaced sealing relationships to be made with said cylindrical pipe first outer peripheral surface section, with said liner material being of a hardness which allows the liner diameter to be readily reduced by the inward urging of said clamp ring semi-independent constriction means overlying said liner third portion in a manner that hydrostatically loads said raised sealing ridges to achieve said multiple sealing realtionships, said elastomeric material further permitting the development of a maximum area of contact between said liner third portion and said cylindrical pipe end portion.

* * * * *